US012712295B2

(12) United States Patent
Ansari et al.

(10) Patent No.: US 12,712,295 B2
(45) Date of Patent: Aug. 18, 2026

(54) ELECTRICAL ASSEMBLY

(71) Applicant: Lear Corporation, Southfield, MI (US)

(72) Inventors: Ajmal Imran Ansari, Canton, MI (US); Michael Scott Duco, Fraser, MI (US); Arthur Kent Hurlburt, IV, Canton, MI (US); Aric Henderson Anglin, Rives Junction, MI (US); Liam McEvilly, Farmington Hills, MI (US)

(73) Assignee: Lear Corporation, Southfield, MI (US)

( * ) Notice: Subject to any disclaimer, the term of this patent is extended or adjusted under 35 U.S.C. 154(b) by 360 days.

(21) Appl. No.: 18/484,795

(22) Filed: Oct. 11, 2023

(65) Prior Publication Data

US 2025/0125544 A1 Apr. 17, 2025

(51) Int. Cl.

*H01R 4/58* (2006.01)
*H01H 50/14* (2006.01)
*H01R 4/02* (2006.01)
*H01R 43/02* (2006.01)

(52) U.S. Cl.

CPC ............... *H01R 4/58* (2013.01); *H01H 50/14* (2013.01); *H01R 4/029* (2013.01); *H01R 43/0221* (2013.01); *H01H 2229/02* (2013.01)

(58) Field of Classification Search

CPC ...... H01R 4/58; H01R 4/029; H01R 43/0221; H01R 4/36; H01R 11/281; H01R 11/282; H01H 50/14

USPC .................................................. 439/212, 754

See application file for complete search history.

(56) References Cited

U.S. PATENT DOCUMENTS 9,196,890 B2 11/2015 Kim et al.
9,368,882 B2 6/2016 Lumetta
9,853,277 B2 12/2017 Benedict et al.
9,991,655 B2 * 6/2018 Pal ..................... H05K 7/20154
10,195,688 B2 2/2019 Dinkelman
10,249,857 B2 4/2019 Lorentz et al.
10,547,043 B2 1/2020 Guo et al.
10,601,014 B2 3/2020 Okada et al.
11,296,389 B2 4/2022 Dulle et al.
11,374,290 B2 6/2022 Okada et al.
2015/0111093 A1 4/2015 Callicoat et al.
2016/0271728 A1 9/2016 Dai et al.
2017/0076877 A1 * 3/2017 Pal ........................... H01H 1/62
2017/0279250 A1 * 9/2017 Pal ........................... H02B 1/04
2018/0132343 A1 * 5/2018 Pal ....................... H05K 1/0203
2018/0330906 A1 * 11/2018 Hiramitsu .......... H05K 7/20272

(Continued)

OTHER PUBLICATIONS

LASERAX, Battery Laser Welding: The Alternative to Ultrasonic Wire Bonding, https://www.laserax.com/battery-laser-welding-applications available at least as early as Oct. 10, 2023.

(Continued)

*Primary Examiner* — Tulsidas C Patel
*Assistant Examiner* — Jeffrey Mountain
(74) *Attorney, Agent, or Firm* — McGarry Bair PC

(57) ABSTRACT

An electrical assembly comprises a body, an electrical terminal connected to the body and a bus bar electrically connected to the electrical terminal. The bus bar includes an aperture in which the electrical terminal is partially disposed. The bus bar includes a slot extending from the aperture. A second electrical terminal can be connected to the body. A second bus bar can be electrically connected to the second electrical terminal.

20 Claims, 12 Drawing Sheets

(56) References Cited

U.S. PATENT DOCUMENTS

| | | | | |
|---|---|---|---|---|
| 2018/0366922 | A1* | 12/2018 | Pal | H01H 9/52 |
| 2020/0136326 | A1* | 4/2020 | Rai | H01H 50/12 |
| 2022/0029403 | A1 | 1/2022 | Shi et al. | |

OTHER PUBLICATIONS

Light Mechanics, https://www.lightmech.com/laser-welding-connectors-to-busbars/ available at least as early as Jun. 7, 2023.

* cited by examiner

ELECTRICAL ASSEMBLY

TECHNICAL FIELD

The present disclosure generally relates to electrical assemblies, including electrical assemblies comprising contactors, bus bars, and/or electrical terminals.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and embodiments are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
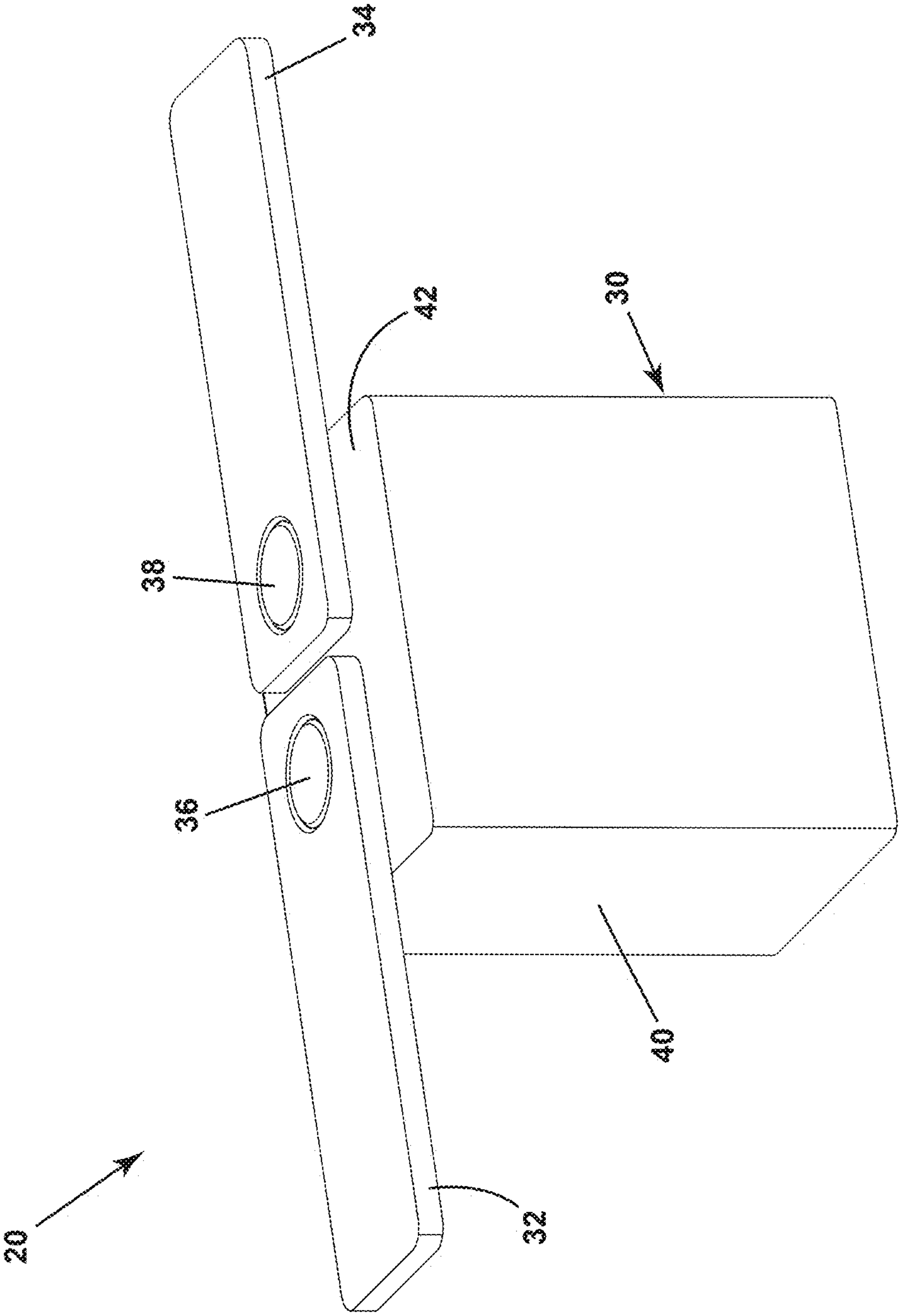
FIG. 1 is a perspective view generally illustrating an embodiment of an electrical assembly according to example teachings of the present disclosure.

Referring to FIG. 1, an electrical assembly 20 includes a body 30, a first bus bar 32, a second bus bar 34, a first terminal 36 (e.g., a first electrical terminal), and a second terminal 38 (e.g., a second electrical terminal). The first terminal 36 and the second terminal 38 are connected (e.g., mechanically) to the body 30. The first bus bar 32 is electrically connected to the first terminal 36. The second bus bar is electrically connected to the second terminal 38. Optionally, the first terminal 36 and the second terminal 38 extend from the same side of the outer surface 40 of the body 30, such as from an upper surface 42. The upper surface 42 can include an electrically insulating material, such as a ceramic material, among others, such as to electrically insulate the terminals 36, 38 from each other.

Figure 2:
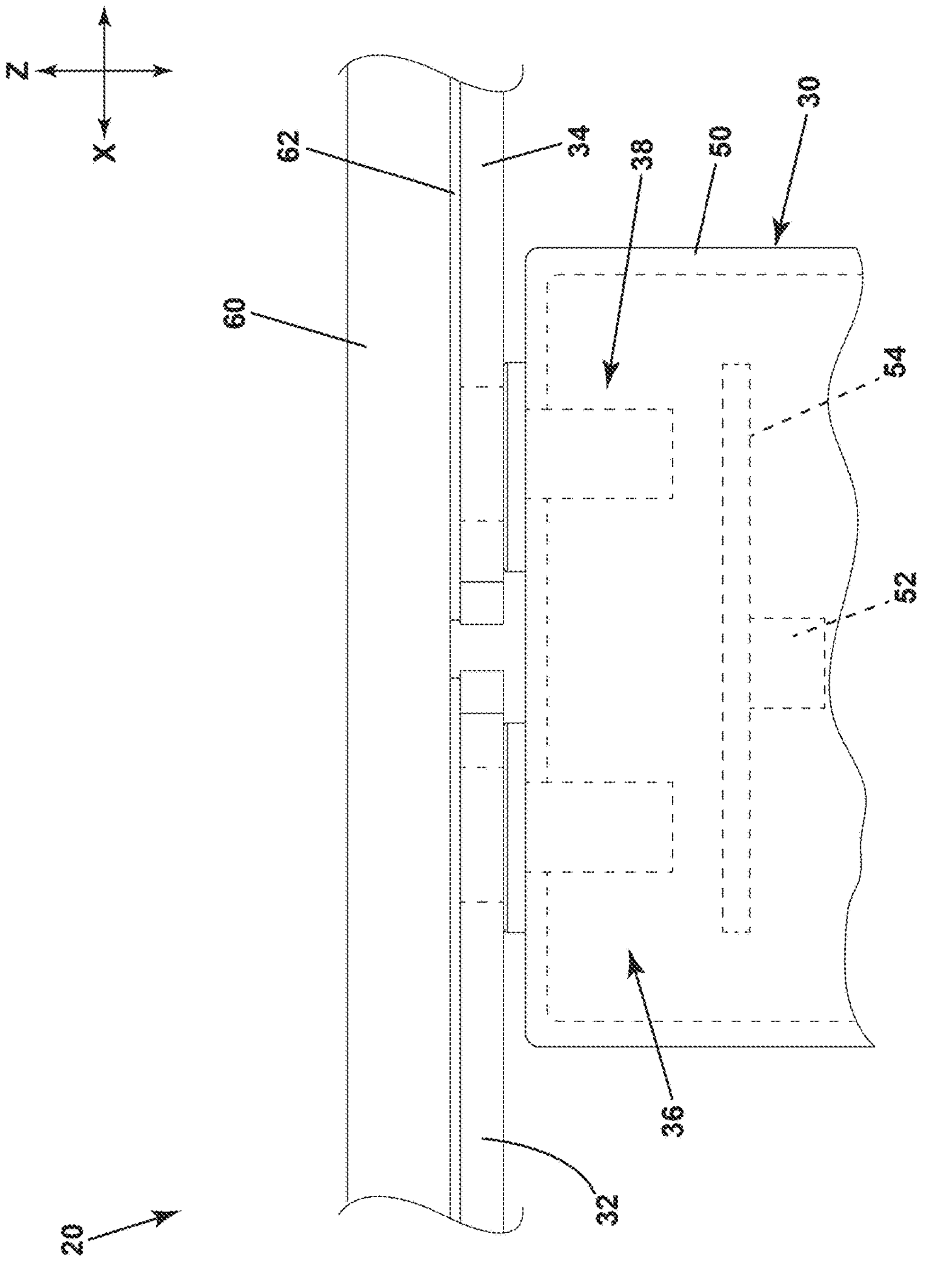
FIG. 2 is a partial cross-sectional view generally illustrating an embodiment of an electrical assembly according to example teachings of the present disclosure.

Referring to FIG. 2, the body 30 can be a contactor body and include a housing 50. Optionally, the housing 50 comprises an electrically insulating material, such as a plastic, an electrically conductive material, such as a metal, or a combination thereof. An actuator 52 (e.g., an electromagnet) coupled with an electrically conductive contact member 54 is disposed in the housing 50. The actuator 52 moves the contact member 54 into and out of contact with the terminals 36, 38 to selectively electrically connect the terminals 36, 38 and the first and second bus bars 32, 34. For example, the electrical assembly 20 can be configured as a contactor. Optionally, the electrical assembly 20 includes a cooling member 60 disposed adjacent the first bus bar 32 and/or the second bus bar 34. A coupling layer 62 can be disposed between the cooling member 60 and the bus bars 32, 34. The coupling layer 62 can comprise an electrically insulating and thermally conductive material such that the coupling layer 62 electrically insulates the bus bars 32, 34 from the cooling member 60 and thermally couples the bus bars 32, 34 with the cooling member 60. The cooling member 60 can include one or more of a variety of configurations. For example, the cooling member 60 can include a heatsink, a cooling plate, cooling fins, heat pipes, cooling fluid passages, or combinations thereof, among other configurations. Optionally, the electrical assembly 20 does not include a cooling member 60 and/or a coupling layer 62.

Figure 3:
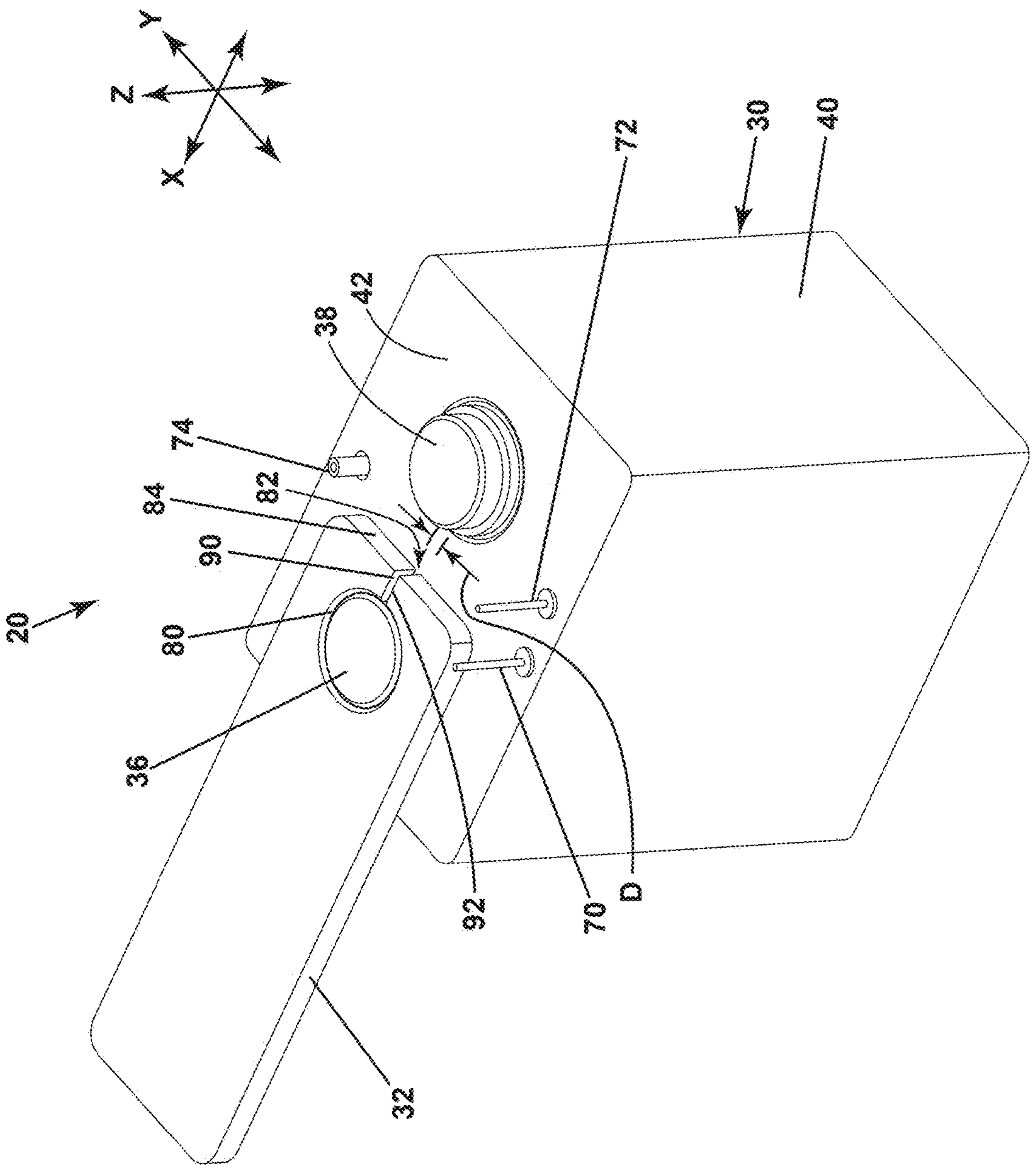
FIG. 3 is a perspective view generally illustrating an embodiment of an electrical assembly according to example teachings of the present disclosure.
Figure 4:
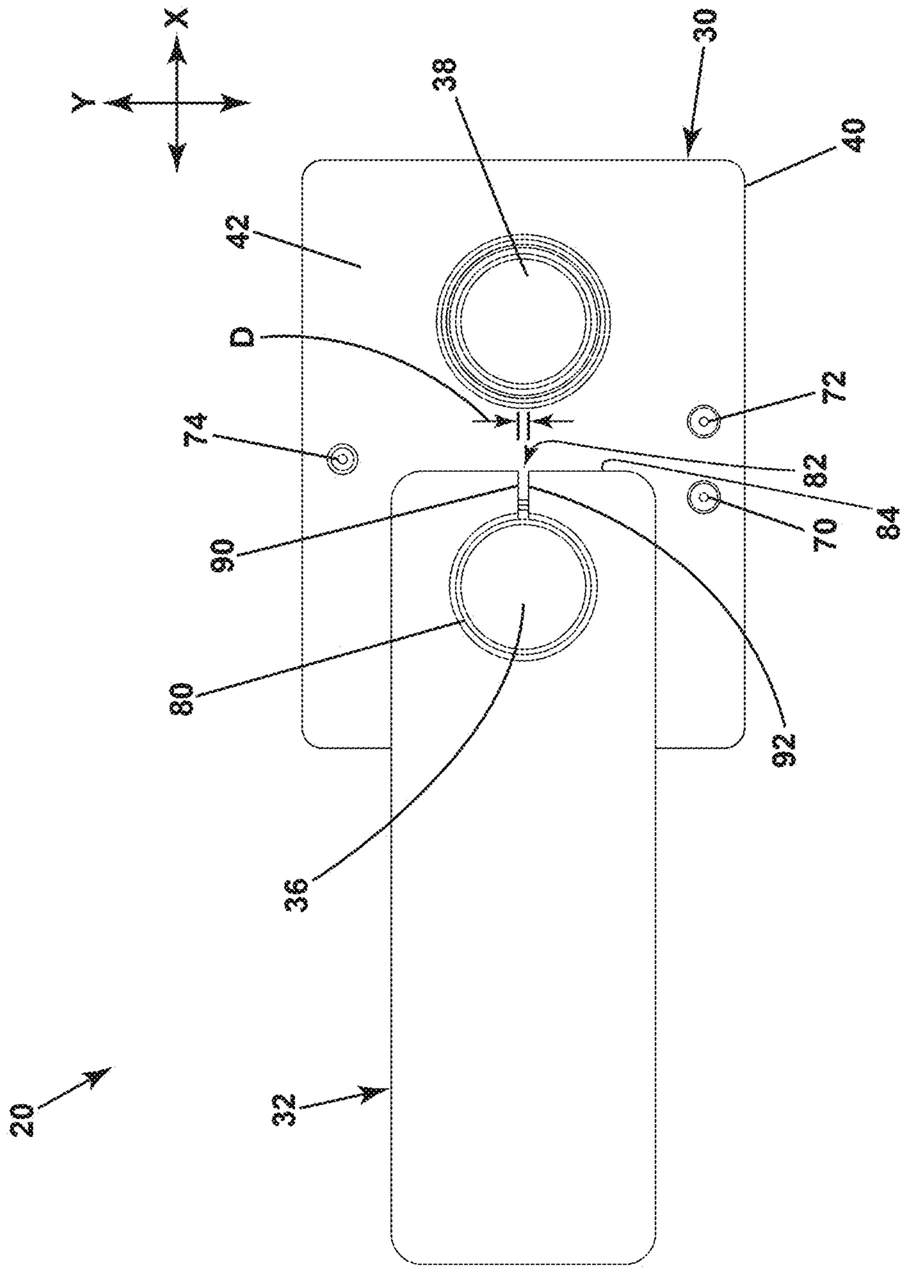
FIG. 4 is a top view generally illustrating an embodiment of an electrical assembly according to example teachings of the present disclosure.

Referring to FIGS. 3 and 4, the body 30 includes control terminals 70, 72 extending from the outer surface 40 of the body 30, such as the upper surface 42. The control terminals 70, 72 are electrically connected to the actuator for controlling the actuator 52. The body includes a vent 74 configured for at least temporarily fluidly coupling the interior of the body 30 with the exterior of the body 30, such as generate a vacuum in the body 30 and/or to fill the body at least partially with a gas (e.g., hydrogen, nitrogen, helium, or combinations thereof). Optionally, the terminals 70, 72 and the vent 74 are disposed at opposite sides of the upper surface 42 of the outer surface 40 of the body 30 and at opposite sides of the terminals 36, 38, but can be disposed at other portions of the outer surface 40.

The first bus bar 32 includes an aperture 80 and a slot 82. The aperture 80 is a through aperture that extends through the first bus bar 32 and partially receives the first terminal 36. The slot 82 extends from the aperture 80 though an outer edge/surface 84 of the first bus bar 32. The slot 82 is shown extending in the longitudinal direction X toward the second terminal 38, but the slot 82 can extend in other directions, such as in the lateral direction Y or at angles between the longitudinal and lateral directions X, Y. The 82 extends through the thickness of the first bus bar 32 in the vertical direction Z. The first bus bar 32 includes a first inner surface 90 and a second inner surface 92 spaced from the first inner surface 90 by a distance D such that the inner surfaces 90, 92 define the slot 82. Optionally, the inner surfaces 90, 92 are planar, parallel to each other, and/or perpendicular to a lateral direction Y. The slot 82 is configured to increase the flexibility and/or compliance of the first bus bar 32 proximate the aperture 80 and to allow the size (e.g., diameter for circular configurations) of the aperture 80 to vary, such as during insertion of the first terminal 36 into the aperture 80. For example, prior to insertion of the first terminal 36, the diameter 80D of the aperture 80 can include a first size and the distance D can have a first size (e.g., in the transverse direction Y), and during insertion, the first bus bar 32 may flex such that the diameter 80D of the aperture 80 includes a second size that is larger than the first size and/or the distance D has a second size that is larger than the first dimension. The first bus bar 32 can remain in the flexed configuration, with the diameter 80D and the distance D having the second sizes, after insertion is complete. While described in connection with the first bus bar 32, the second bus bar 34 (FIG. 1) can also include an aperture 80 and a slot 82. Optionally, the first bus bar 32 and/or the second bus bar 34 does not include a slot 82, 86, such as if a clearance and/or tolerance between the bus bars 32, 34 and the terminals 36, 38 is small (e.g., about 0.05 mm or less).

The aperture 80 includes a cylindrical configuration but can include other configurations. For example, the aperture 80 can include one or more tapered portions, such as to provide the aperture 80 with a conical configuration. With a conical aperture 80, the first terminal 36 can include a corresponding conical configuration, which may increase the surface area of the contact between the first bus bar 32 and the first terminal 36 and/or may reduce the influence of radial tolerances of the aperture 80 and the terminal 36.

Figure 5:
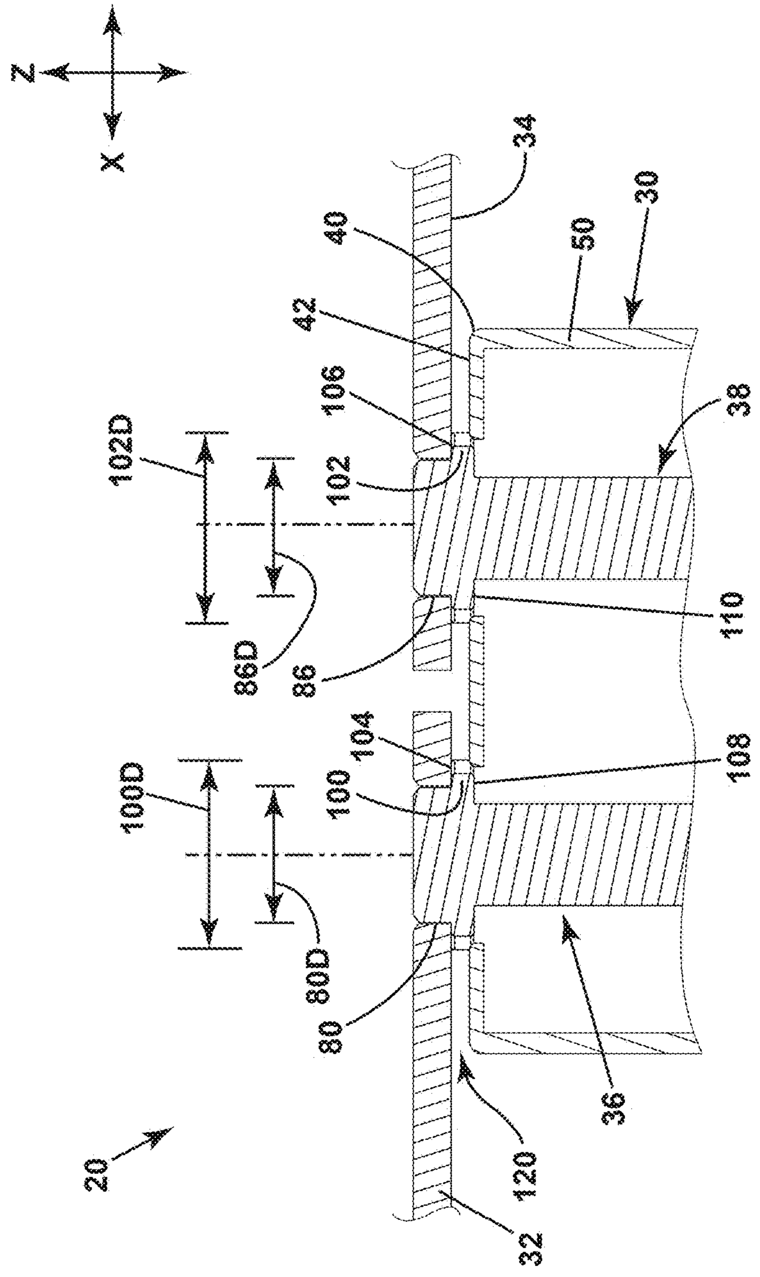
FIG. 5 is a partial cross-sectional view generally illustrating an embodiment of an electrical assembly according to example teachings of the present disclosure.

Referring to FIG. 5, the first terminal 36 and the second terminal 38 include shoulders 100, 102 that extend radially outward from the terminals 36, 38 (e.g., relative to central axes of the terminals 36, 38 extending in the vertical direction Z) to define first axial surfaces 104, 106 that face away from the body 30 and second axial surfaces 108, 110 that face and are in contact with the outer surface 40, such as the upper surface 42, of the body 30. The terminals 36, 38 are disposed partially on the shoulders 100, 102, such as on the axial surfaces 104, 106, and the shoulders 100, 102 extend beyond (e.g., in an X-Y plane) the apertures 80. For example, with circular configurations of the terminals 36, 38, the outer diameters 100D, 102D of the shoulders 100, 102 (e.g., circumferential shoulders) are greater than the maximum inner diameters 80D, 86D of the apertures 80, 86 such that the shoulders 100, 102 are not disposed in the apertures 80. The shoulders 100, 102 space the bus bars 32, 34 from the upper surface 42 of the body 30 (e.g., in the vertical direction Z) such that a gap 120 is present between the upper surface 42 and at least some portions of the bus bars 32, 34. The diameters 100D, 102D can, for example, be equal to or between 5% and 20% larger than the diameters 80D, 86D of the bus bar apertures 80, 86.

Figure 6:
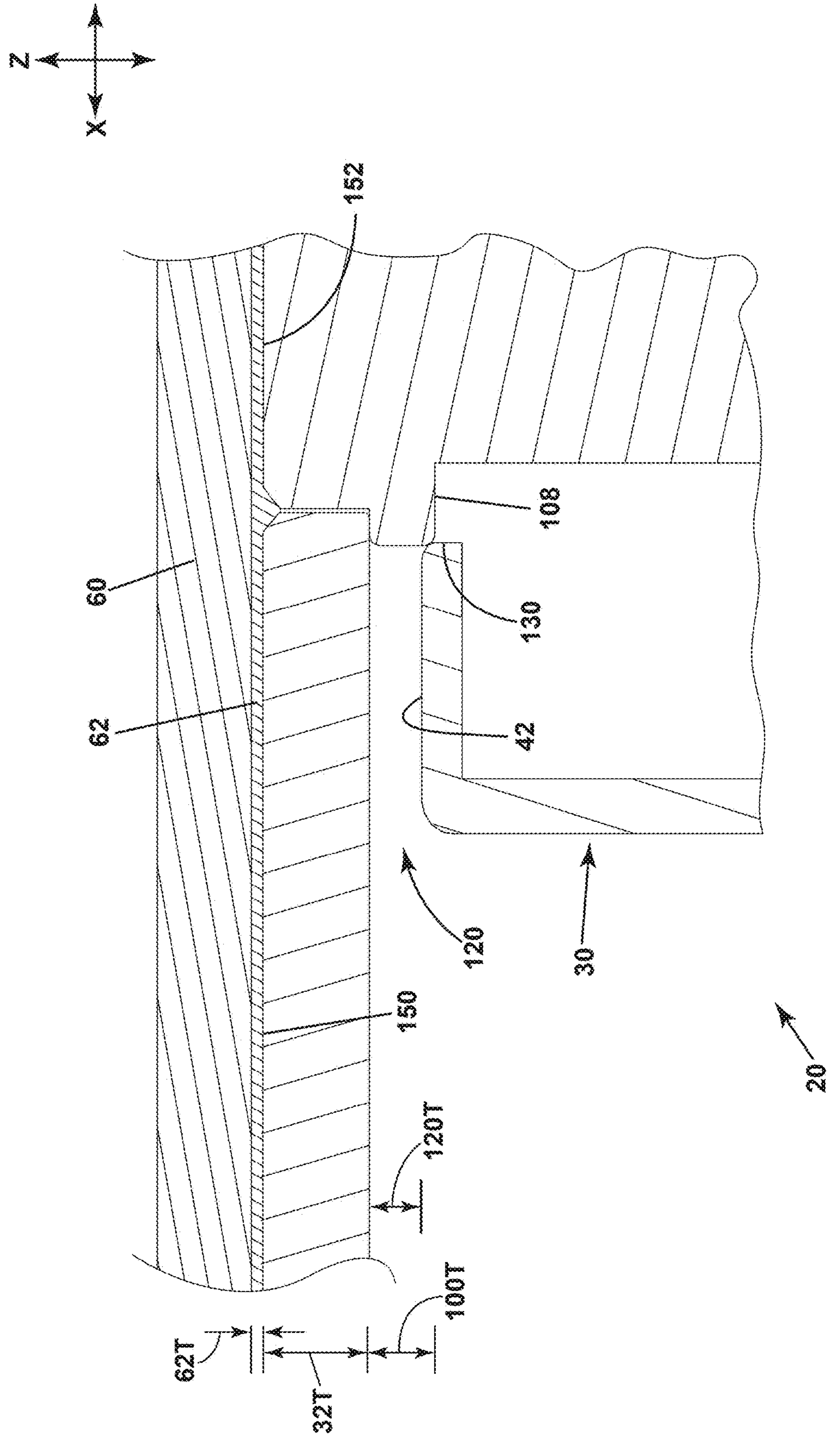
FIG. 6 is an enlarged partial cross-sectional view generally illustrating an embodiment of an electrical assembly according to example teachings of the present disclosure.

Referring to FIG. 6, a thickness 32T of the first bus bar 32 is thicker than a thickness 100T of the shoulder 100. For example and without limitation, the thickness 100T can be equal to or between 20% and 60%, such as about 30%, of the thickness 32T. Optionally, the thickness 100T is equal to or greater than the thickness 32T. The thickness 100T can correspond to a minimum thickness for brazing the terminal 36 with the body 30 (e.g., with the upper surface 42), and/or a minimum thickness for blocking a laser during welding. The thickness 32T can correspond to a desired current capacity. A portion of the shoulder 100, which can include the axial surface 108, is disposed in the body 30, such as in a housing aperture 130 of the housing 50. With such a configuration, the size 120T (e.g., in the vertical direction Z) of the gap 120 is less than the thickness 100T of the shoulder 100. In other configurations, the shoulder 100 is not disposed in the body 30 and the size 120T of the gap 120 is equal to or greater than the thickness 100T of the shoulder 100.

The upper surface 150 of the first bus bar 32 and the upper surface 152 of the first terminal 36 are parallel and offset in the vertical direction Z by 10% or less of the thickness 32T of the bus bar 32 or not offset at all (e.g., are coplanar). For example, the upper surface 150 of the first bus bar 32 and the upper surface 152 of the first terminal 36 can be disposed at the same height above the upper surface 42 of the body 30. Such a configuration can reduce and/or minimize a thickness 62T of the coupling layer 62, which can reduce and/or minimize (i) the amount of coupling layer material 62 and/or (ii) the distance between the cooling member 60 and the first bus bar 32 and the first terminal 36. The cooling member 60 can, in some examples, be disposed at the same distance from the upper surfaces 150, 152 of the first bus bar 32 and the first terminal 36. The second bus bar 34 can be connected with the second terminal 38 in the same manner as or a different manner than the first bus bar 32 with the first terminal 36. For example, the second bus bar 34 can include an aperture 86 and include a slot 88 defined by inner surfaces 94, 96 (see FIG. 7).

Figure 7:
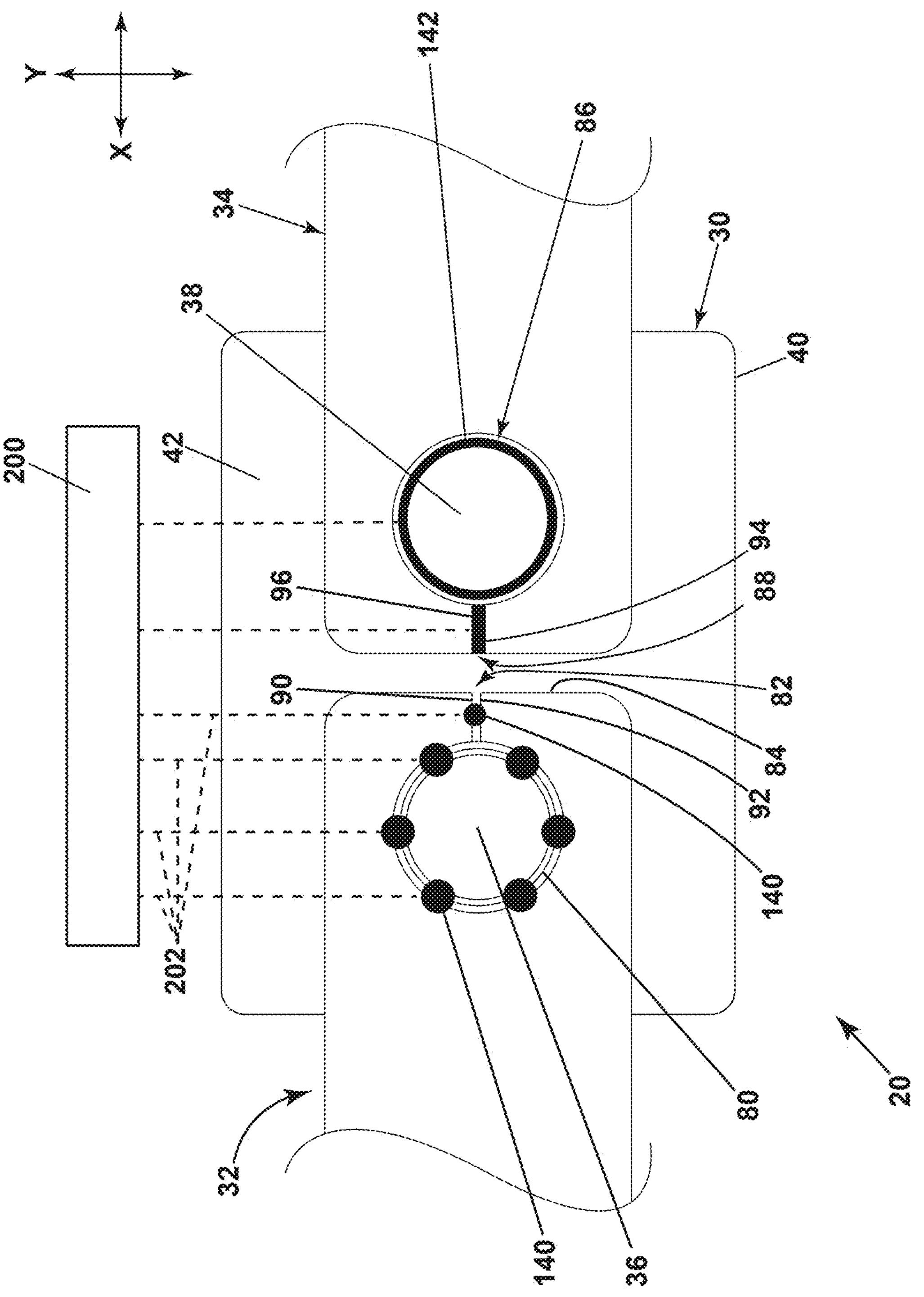
FIG. 7 is a schematic top view generally illustrating an embodiment of an electrical assembly and a welder according to example teachings of the present disclosure.

Referring to FIG. 7, the bus bars 32, 34 are fixed to the terminals 36, 38, respectively, via welding, such as via laser welding. The welding can include welding via spot welds 140 (e.g., separate and circumferentially spaced spot welds), such as illustrated with the aperture 80 of the first bus bar 32 and the first terminal 36, and/or via one or more peripheral welds 142, such as illustrated with the aperture 86 of the second bus bar 34 and the second terminal 38. A peripheral weld (e.g., a circumferential weld for circular configurations) can extend along some or all of the periphery of the aperture 80 of a bus bar (e.g., the bus bars 32, 34), and/or some or all of the periphery of the terminal (e.g., the terminals 36, 38). With some examples, one or both of the bus bars 32, 34 is fixed with the terminal 36, 38 via a circumferential laser weld about the full circumference of the terminal 36, 38. The slot 82, 88 can be welded closed via spot welding and/or an elongated weld. For example, the inner surfaces 90, 92 of the slot 82 of the first bus bar 32 can be welded together, and/or the inner surfaces 94, 96 of the slot 88 of the second bus bar 34 can be welded together.

Both bus bars 32, 34 can be spot welded with the terminals 36, 38, both bus bars 32, 34 can be circumferentially welded with the terminals 36, 38, or the bus bars 32, 34 can be welded differently from each other. In some configurations, a bus bar 32, 34 can be welded with a terminal 36, 38 via spot welding at some portions of a circumference of the terminal 36, 38 and via circumferential welding along other portions of the circumference of the terminal 36, 38.

Figure 8:
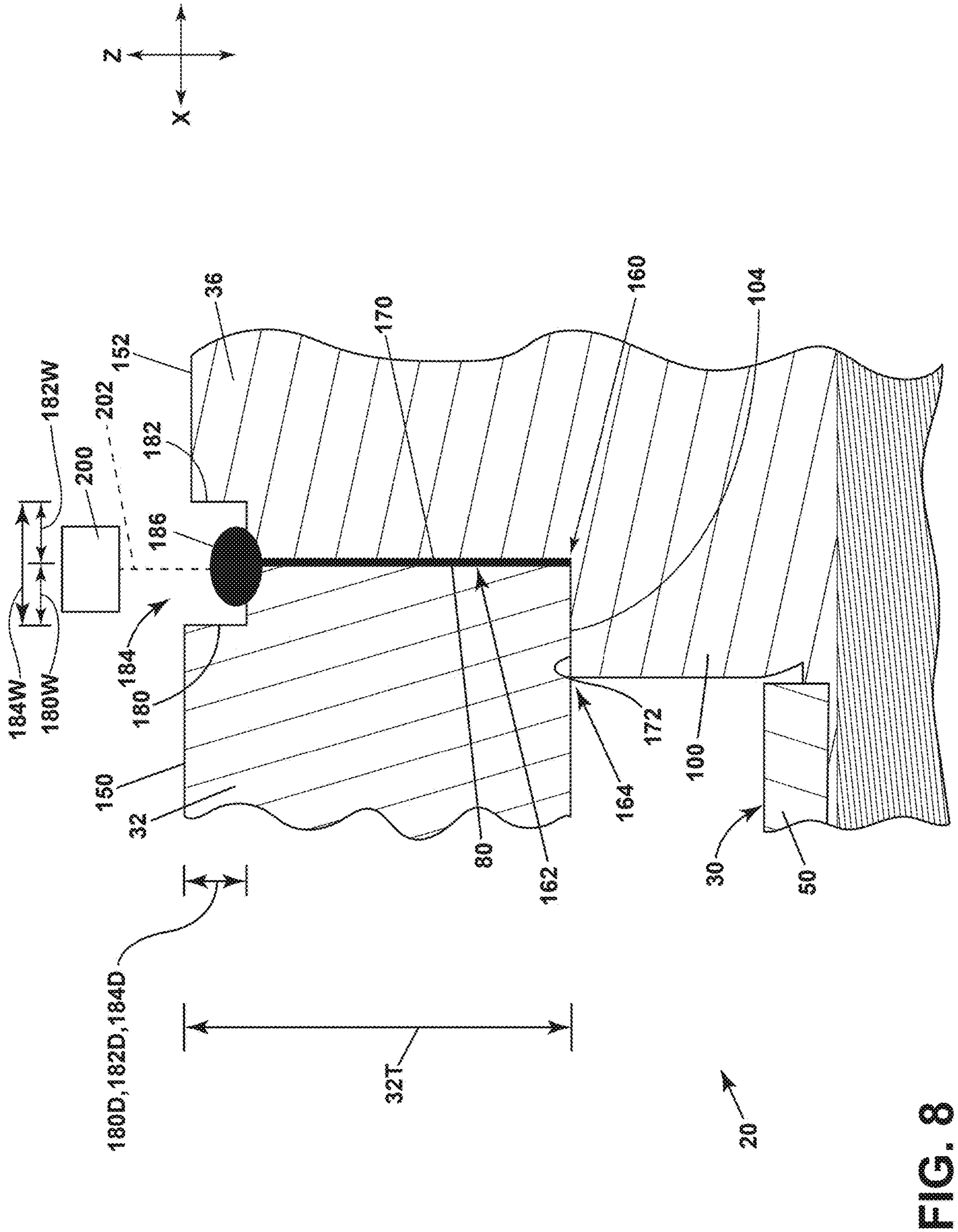
FIG. 8 is a schematic partial cross-sectional view generally illustrating an embodiment of an electrical assembly and a welder according to example teachings of the present disclosure.

Referring to FIG. 8, an interface 160 between the first bus bar 32 and the first terminal 36 includes a first interface portion 162 and a second interface portion 164. The first interface portion 162 includes the interface between the surface of the aperture 80 of the first bus bar 32 and a radial surface 170 of the first terminal 36. The first interface portion 162 is parallel with the vertical direction Z but can include other configurations. The first interface portion 162 can include an interference fit, a slip fit, or a clearance fit of the first bus bar 32 with the first terminal 36. The second interface portion 164 includes the interface between a lower surface 172 of the first bus bar 32 and the axial surface 104 of the shoulder 100 of the first terminal 36. The first interface portion 162 is welded to fix the first bus bar 32 with the first terminal 36, such as via circumferential welding, spot welding, or a combination thereof. The welding can include laser welding, and the shoulder 100 is aligned with the first interface portion 162 in the vertical direction Z such that the shoulder 100 limits or prevents laser light of the laser 202 of the welder 200 from reaching the body 30, such as from reaching the housing 50 and/or elements disposed therein. For example, the shoulder 100 may protect one or more portions of the body 30 during welding. The laser 202 may penetrate into the shoulder 100, such as equal to or between 5% and 10% of the thickness 32T of the bus bar 32. The thickness 100T may be selected to be at least 10% of the thickness 32T of the bus bar 32. Additionally or alternatively, the shoulder 100 may help maintain proper alignment of the first bus bar 32 with the first terminal 36, such as during welding.

The upper surface 150 of the first bus bar 32 includes a recess 180 disposed about a periphery of the aperture 80. The thickness 32T of the first bus bar 32 is reduced, relative to at least some other portions of the first bus bar 32 at the recess 180. The upper surface 152 of the first terminal 36 includes a terminal recess 182 disposed about a periphery of the first terminal 36. In an assembled configuration, the recess 180 and the terminal recess 182 collectively at least partially define a weld channel 184. One or more weld beads 186 are disposed in the weld channel 184. The one or more weld beads 186 are formed during welding of the first bus bar 32 with the first terminal 36. The one or more weld beads 186 can be disposed in the weld channel 184 such that the one or more weld beads 186 do not extend beyond the weld channel 184, such as in the vertical direction Z. The weld cannel 184 can be annular, such as with circular configurations of the first terminal 36. The weld bead 186 is shown as elliptical in FIG. 8 for illustrative purposes only. The weld bead 186 can have a variety of shapes, including round, rounded, polygonal, non-polygonal, and/or combinations thereof, among others.

The recess 180 includes a width 180W that may be defined in an X-Y plane, and a depth 180D in the vertical direction Z. The terminal recess 182 includes a width 182W that may be defined in the X-Y plane, and a depth 182D in the vertical direction Z. The weld channel 184 includes a width 184W that can be equal to the sum of the widths 180W, 182W plus a clearance between the first bus bar 32 and the first terminal 36, if any, and a depth 184D that can be equal to the depths 180D, 182D. The depths 180D, 182D and the widths 180W, 182W can be configured such that the depth 184D and the width 184W are at least as large as the expected size of the one or more weld beads 186. In some examples, the depths 180D, 182D can be equal to each other and/or can be equal to or between 5% and 10% of the thickness 32T of the first bus bar 32. Additionally or alternatively, in some examples, the widths 180W, 182W can be equal to each other, can be equal to the depths 180D, 182D, and/or can be equal to or between 5% and 10% of the thickness 32T of the first bus bar 32. In some examples, the width 184W can be equal to or between 10% and 15% of the thickness 32T of the first bus bar 32.

Figures 9A, 9B, 9C:
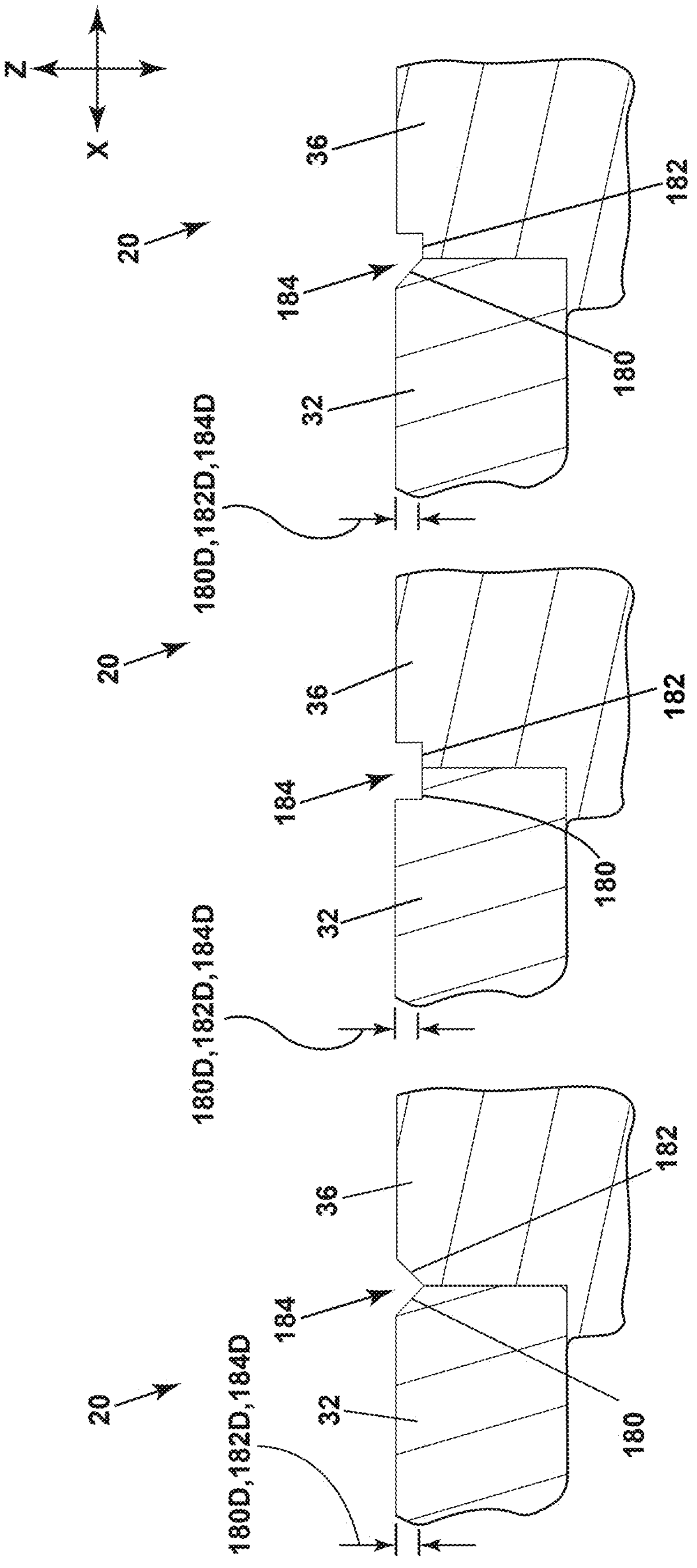
FIGS. 9A-9C are partial cross-sectional views generally illustrating embodiments of an electrical assembly according to example teachings of the present disclosure.

Referring to FIGS. 9A-9C, the recesses 180, 182 can include one or more of a variety of configurations. For example, the recesses 180, 182 can be chamfered such that the depths 180D, 182D increase toward the first interface portion 162 (FIG. 9A), the recesses 180, 182 can have rectangular cross-sections (FIG. 9B), or the recesses 180, 182 can have a combination of chamfered and rectangular configurations (FIG. 9C), among other possible configurations.

Figure 10:
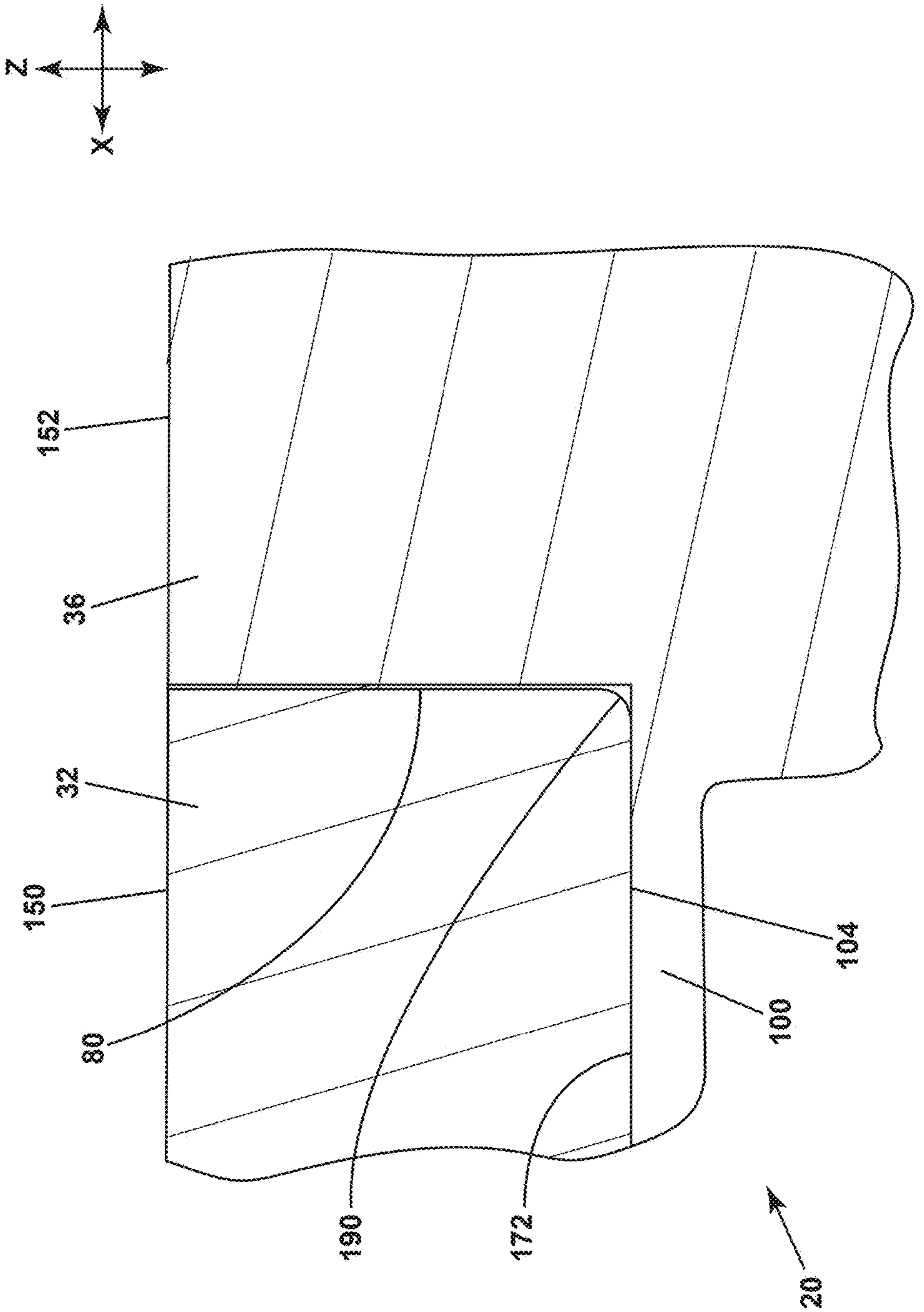
FIG. 10 is an enlarged partial cross-sectional view generally illustrating an embodiment of an electrical assembly according to example teachings of the present disclosure.

Referring to FIG. 10, the first bus bar 32 can include a chamfered/radiused corner 190 at the intersection of the surface of the aperture 80 and the lower surface 172. The chamfered/radiused corner 190 can facilitate the first bus bar 32 sitting partially on the shoulder 100 such the lower surface 172 is flush against the axial surface 104 of the shoulder 100 and/or such that the upper surfaces 150, 152 are coplanar. The chamfered/radius corner 190 can, additionally or alternatively, facilitate assembly of the bus bar 32 with the terminal 36 prior to welding, such as by providing a guiding surface and centering the bus bar aperture 80 on the terminal 36.

Figure 11C:
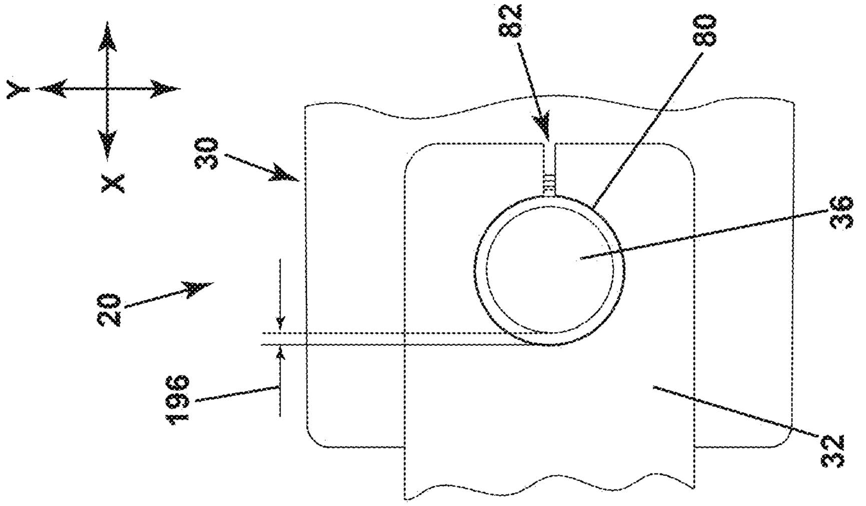
FIGS. 11A-11C are partial top views generally illustrating embodiments of an electrical assembly according to example teachings of the present disclosure.
Figure 11B:
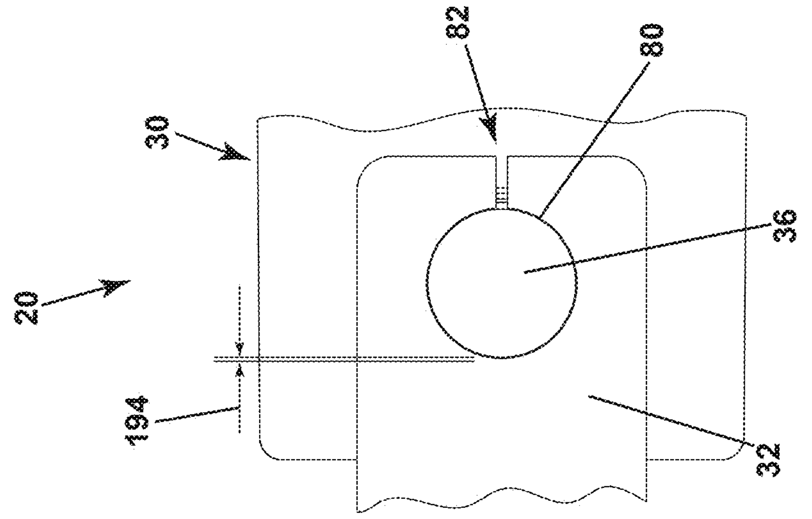
Figure 11A:
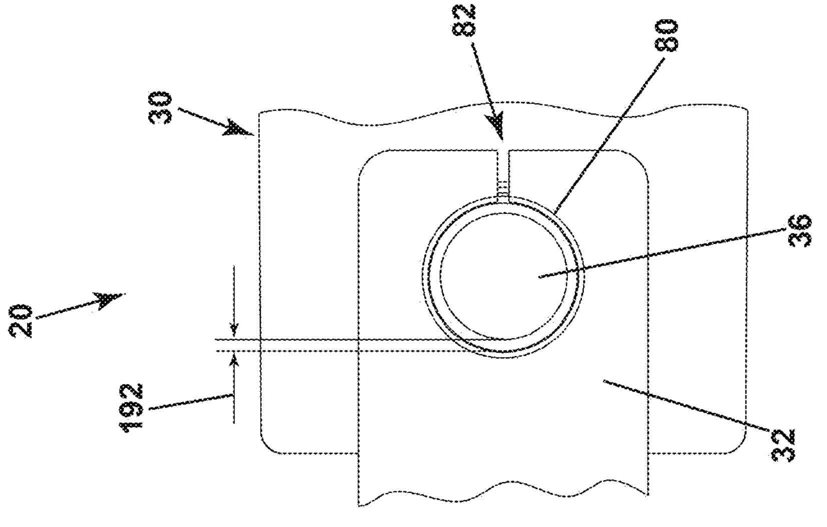

Referring to FIGS. 11A-11C, the first bus bar 32 can be designed to have a clearance fit 192 (FIG. 11A), a slip fit 194 (FIG. 11B), or an interference fit 196 (FIG. 11C) with the first terminal 36. Additionally or alternatively, the tolerances of the aperture 80 can include a clearance fit, a slip fit, and an interference fit. For example and without limitation, with a circular configuration of the first terminal 36, the tolerance for the radius of the aperture 80 can range from 0.1 mm larger than the radius of the first terminal 36 (e.g., a clearance fit) to 0.1 mm smaller than the radius of the first terminal 36 (e.g., an interference fit), which includes a slip fit (e.g., 0.02 mm larger than the radius of the first terminal 36). This range of tolerances can be enabled by the slot 82 allowing for varying of the size (e.g., radius for circular applications) after formation of the first bus bar 32 and during insertion of the first terminal 36 into the aperture 80. Without the slot 82, an interference fit and/or as large of a negative tolerance of the aperture 80 may not be feasible with the first terminal 36 and/or with laser welding. For example, forces associated with an interference fit, without a slot 82, may damage the body 30, such as the upper surface 42.

With some configurations, the shoulders 100, 102 can (i) providing a bearing surface for the bus bar 32, 34, (ii) function as a locating feature for vertical direction Z positioning of the bus bars 32, 34, (iii) facilitate maintaining of the bus bars 32, 34 in position (e.g., parallel to an X-Y plane) during welding, (iv) block the laser 202 from impinging on and damaging the upper surface 42.

While various example features are described in connection with the first bus bar 32 or the second bus bar 34, such example features can be applied to either, both, or neither of the bus bars 32, 34, which may or may not have the same configuration. While various example features are described in connection with the first terminal 36 or the second terminal 38, such example features can be applied to either, both, or neither of the terminals 36, 38, which may or may not have the same configuration.

With some examples, the bus bars 32, 34 may not be threaded and/or at least the portions of the terminals 36, 38 disposed outside the body 30 may not be threaded.

Figure 12:
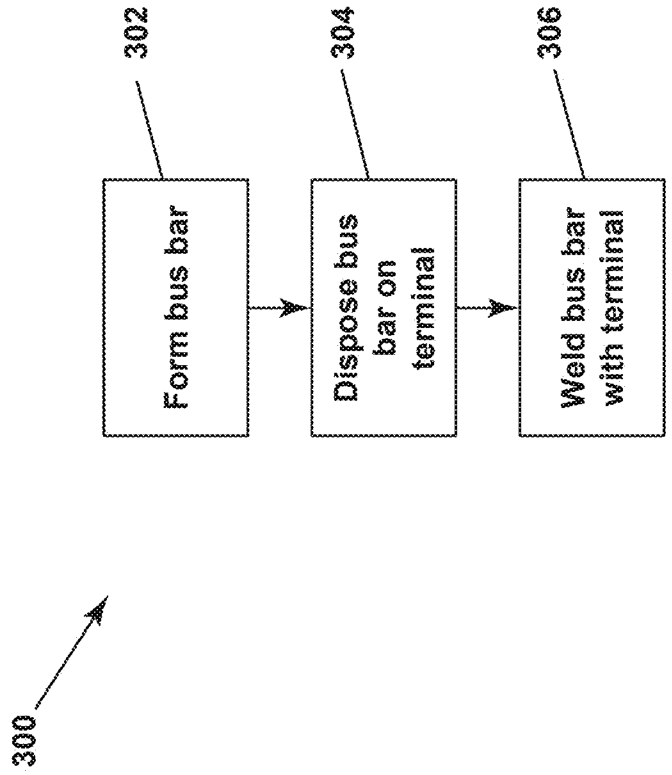
FIG. 12 is a flow diagram generally illustrating an embodiment of a method of assembling an electrical assembly according to example teachings of the present disclosure.

Referring to FIG. 12, a method 300 of assembling the electrical assembly 20 is generally illustrated. The method 300 includes forming the first bus bar 32 (block 302). Forming the first bus bar (block 302) can include forming the first bus bar 32 with the aperture 80 with a tolerance including a clearance fit, a slip fit, and an interference fit. The method 300 includes disposing the first bus bar 32 on the first terminal 36 such that the first terminal 36 is disposed partially in the aperture 80 (e.g., inserting the first terminal 36 into the aperture 80) (block 304). Disposing the first bus bar 32 on the first terminal 36 can include increasing, at least temporarily, a dimension of the slot 82. For example, if a dimension of the aperture 80 is smaller than a dimension of the inserted portion of the first terminal 36, the first bus bar 32 may flex such that the inner surfaces 90, 92 move away from each other and increase at least one dimension of the aperture 80. The method 300 includes welding (e.g., laser welding) the first bus bar 32 with the first terminal 36 (block 306). For example, a welder 200 may direct one or more lasers 202 to the first interface portion 162 and/or to the slot 82 (see FIG. 7). The welding (block 306) can include laser welding about a full circumference of the first terminal 36. Additionally or alternatively, the welding (block 306) can include laser welding the first inner surface 90 with the second inner surface 92. During the welding (block 306), the shoulder 100 may limit or prevent the one or more lasers/laser light from reaching the body 30, such as to limit or prevent damage to the body 30.

The method 300 can be repeated with for the second bus bar 34 and the second terminal 38, and at least some portions may be conducted in parallel with the actions associated with the first bus bar 32 and the first terminal 36.

Embodiments of electrical assemblies 20 can have lower resistance between the bus bars 32, 34 and the terminals 36, 38 compared to other designs, such as designs that bolt bus bars onto terminals. Additionally or alternatively, assembly of embodiments of electrical assemblies 20 can be less complex as separate fasteners (e.g., bolts) may not be used in connecting the bus bars 32, 34, with the terminals 36, 38.

The instant disclosure includes the following non-limiting embodiments:

1. An electrical assembly, comprising: a body; an electrical terminal connected to the body; and a bus bar electrically connected to the electrical terminal, the bus bar including an aperture in which the electrical terminal is partially disposed and including a slot extending from the aperture to an outer edge of the electrical terminal.
2. The electrical assembly of any preceding embodiment, further comprising: a second electrical terminal connected to the body; and a second bus bar electrically connected to the second electrical terminal; wherein the body is a contactor body including a housing; an actuator and a contact member are disposed in the housing; and the actuator moves the contact member into contact with the electrical terminal and the second electrical terminal to selectively electrically connect the bus bar with the second bus bar.
3. The electrical assembly of any preceding embodiment, wherein the bus bar is laser welded with the electrical terminal about at least a portion of a periphery of the aperture.
4. The electrical assembly of any preceding embodiment, wherein the bus bar includes a first inner surface and a second inner surface that define the slot; and the first inner surface and the second inner surface are welded together.
5. The electrical assembly of any preceding embodiment, wherein the bus bar includes a recess disposed about a periphery of the aperture; and a thickness of the bus bar at the recess is reduced relative to at least some other portions of the bus bar.
6. The electrical assembly of any preceding embodiment, wherein the electrical terminal includes a terminal recess; and the recess of the bus bar and the terminal recess collectively at least partially define a weld channel.
7. The electrical assembly of any preceding embodiment, wherein a weld bead is disposed in the weld channel such that the weld bead does not extend outward beyond the weld channel.
8. The electrical assembly of any preceding embodiment, wherein an upper surface of the bus bar and an upper surface of the electrical terminal are disposed at the same height above the body.
9. The electrical assembly of any preceding embodiment, wherein an upper surface of the bus bar and an upper surface of the electrical terminal are coplanar.
10. The electrical assembly of any preceding embodiment, wherein the electrical terminal includes a circumferential shoulder; the bus bar is disposed partially on the circumferential shoulder; and the circumferential shoulder extends radially beyond the aperture.
11. The electrical assembly of any preceding embodiment, wherein the bus bar is fixed to the electrical terminal via a circumferential laser weld about a full circumference of the electrical terminal.
12. The electrical assembly of any preceding embodiment, wherein the circumferential shoulder is spaced from the body such that the bus bar is spaced from the body and a gap is defined between the bus bar and the body.
13. The electrical assembly of any preceding embodiment, wherein the bus bar is fixed to the electrical terminal via a plurality of separate and circumferentially spaced spot welds.
14. The electrical assembly of any preceding embodiment, wherein the bus bar is interference fit on the electrical terminal.
15. A method of assembling the electrical assembly of any preceding embodiment, the method comprising: disposing the bus bar on the electrical terminal such that the electrical terminal is disposed partially in the aperture; and laser welding the bus bar with the electrical terminal.
16. The method of any preceding embodiment, wherein the laser welding includes laser welding about a full circumference of the electrical terminal.
17. The method of any preceding embodiment, wherein the bus bar includes a first inner surface and a second inner surface that define the slot; and the laser welding includes laser welding the first inner surface with the second inner surface.
18. The method of any preceding embodiment, wherein during the laser welding about the full circumference of the electrical terminal, a circumferential shoulder of the electrical terminal prevents laser light from reaching the body.
19. The method of any preceding embodiment, wherein disposing the bus bar on the electrical terminal includes increasing a dimension of the slot.
20. The method of any preceding embodiment, further comprising forming the bus bar with the aperture with a tolerance including a clearance fit and an interference fit relative to the electrical terminal.
21. The electrical assembly of any preceding embodiment wherein upper surfaces of the bus bar and the electrical terminal are coplanar.

22. The electrical assembly of any preceding embodiment including a cooling member disposed adjacent the bus bar and the electrical terminal.
23. The electrical assembly of any preceding embodiment wherein the cooling member is disposed at the same distance from the upper surface of the bus bar and the upper surface of the electrical terminal.
24. The electrical assembly of any preceding embodiment, comprising a second electrical terminal connected to the body and a second bus bar electrically connected to the second electrical terminal; wherein the second bus bar includes an aperture in which the second electrical terminal is partially disposed and including a slot extending from the aperture to an outer edge of the second electrical terminal.
25. The electrical assembly of any preceding embodiment wherein the electrical assembly is configured as a contactor and selectively electrically connects the bus bar with the second bus bar.
26. The electrical assembly of any preceding embodiment, wherein the aperture is circular, cylindrical, conical, or a combination thereof.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," "an embodiment," "with some configurations," "in some configurations," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," "an embodiment," "with some configurations," "in some configurations," or the like, in places throughout the specification are not necessarily all referring to the same embodiment. Furthermore, the particular features, structures, and/or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element, unless the context clearly indicates otherwise. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first element could be termed a second element, and, similarly, a second element could be termed a first element, without departing from the scope of the various described embodiments. The first element and the second element are both elements, but they are not the same element.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. Uses of "and" and "or" are to be construed broadly (e.g., to be treated as "and/or"). For example and without limitation, uses of "and" do not necessarily require all elements or features listed, and uses of "or" are inclusive unless such a construction would be illogical. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. Uses of "e.g." and "such as" in the specification are to be construed broadly and are used to provide non-limiting examples of embodiments of the disclosure, and the disclosure is not limited to such examples.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

All matter contained in the above description or shown in the accompanying drawings shall be interpreted as illustrative only and not limiting. Changes in detail or structure may be made without departing from the present disclosure.

What is claimed is:

1. An electrical assembly, comprising:
- a body;
- an electrical terminal connected to the body; and
- a bus bar electrically connected to the electrical terminal, the bus bar including an aperture in which the electrical terminal is partially disposed and including a slot extending from the aperture to an outer edge of the bus bar, wherein the bus bar includes a recess disposed about a periphery of the aperture and a thickness of the bus bar at the recess is reduced relative to at least some other portions of the bus bar.

2. The electrical assembly of claim 1, further comprising:
- a second electrical terminal connected to the body; and
- a second bus bar electrically connected to the second electrical terminal;
- wherein the body is a contactor body including a housing;
- an actuator and a contact member are disposed in the housing; and
- the actuator moves the contact member into contact with the electrical terminal and the second electrical terminal to selectively electrically connect the bus bar with the second bus bar.

3. The electrical assembly of claim 1, wherein the bus bar is laser welded with the electrical terminal about at least a portion of a periphery of the aperture.

4. The electrical assembly of claim 1, wherein the bus bar includes a first inner surface and a second inner surface that define the slot; and
- the first inner surface and the second inner surface are welded together.

5. The electrical assembly of claim 1, wherein the electrical terminal includes a terminal recess; and
- the recess of the bus bar and the terminal recess collectively at least partially define a weld channel.

6. The electrical assembly of claim 5, wherein a weld bead is disposed in the weld channel such that the weld bead does not extend outward beyond the weld channel.

7. The electrical assembly of claim 5, wherein an upper surface of the bus bar and an upper surface of the electrical terminal are disposed at the same height above the body.

8. The electrical assembly of claim 5, wherein an upper surface of the bus bar and an upper surface of the electrical terminal are coplanar.

9. The electrical assembly of claim 5, wherein the electrical terminal includes a circumferential shoulder;
- the bus bar is disposed partially on the circumferential shoulder; and
- the circumferential shoulder extends radially beyond the aperture.

10. The electrical assembly of claim 9, wherein the bus bar is fixed to the electrical terminal via a circumferential laser weld about a full circumference of the electrical terminal.

11. The electrical assembly of claim 9, wherein the circumferential shoulder is spaced from the body such that the bus bar is spaced from the body and a gap is defined between the bus bar and the body.

12. The electrical assembly of claim 9, wherein the bus bar is fixed to the electrical terminal via a plurality of separate and circumferentially spaced spot welds.

13. The electrical assembly of claim 1, wherein the bus bar is interference fit on the electrical terminal.

14. A method of assembling an electrical assembly, the method comprising:
- disposing a bus bar on an electrical terminal such that the electrical terminal is disposed partially in an aperture of the bus bar, wherein the bus bar includes a recess disposed about a periphery of the aperture and a thickness of the bus bar at the recess is reduced relative to at least some other portions of the bus bar; and
- laser welding the bus bar with the electrical terminal.

15. The method of claim 14, wherein the laser welding includes laser welding about a full circumference of the electrical terminal.

16. The method of claim 15, wherein the bus bar includes a slot extending from the aperture to an outer edge of the bus bar, and wherein the bus bar includes a first inner surface and a second inner surface that define the slot; and
- the laser welding includes laser welding the first inner surface with the second inner surface.

17. The method of claim 14, wherein disposing the bus bar on the electrical terminal includes increasing a dimension of the slot.

18. The method of claim 15, wherein the electrical assembly comprises a body and the electrical terminal is connected to the body, and wherein during the laser welding about a full circumference of the electrical terminal, a circumferential shoulder of the electrical terminal prevents laser light from reaching the body.

19. The method of claim 14, further comprising forming the bus bar with the aperture with a tolerance including a clearance fit or an interference fit relative to the electrical terminal.

20. An electrical assembly, comprising:
- a body;
- an electrical terminal connected to the body; and
- a bus bar electrically connected to the electrical terminal, the bus bar including an aperture in which the electrical terminal is partially disposed, wherein the bus bar includes a recess disposed about a periphery of the aperture, wherein the electrical terminal includes a terminal recess, and wherein the recess of the bus bar and the terminal recess collectively at least partially define a weld channel.

* * * * *